United States Patent [19]
Walker

[11] Patent Number: 5,129,156
[45] Date of Patent: Jul. 14, 1992

[54] METHOD FOR SETTING THE AXIAL END PLAY OF TAPERED ROLLER BEARINGS

[75] Inventor: Dale C. Walker, Erie, Pa.

[73] Assignee: General Electric Company, Erie, Pa.

[21] Appl. No.: 631,137

[22] Filed: Dec. 20, 1990

[51] Int. Cl.$^5$ .............................................. B21D 53/12
[52] U.S. Cl. ............................. 29/898.09; 29/898.07; 29/168; 29/803; 384/583; 384/626
[58] Field of Search ............ 29/898.04, 898.07, 898.09, 29/168, 423, 446, 803; 384/559, 583, 584, 595, 626

[56] References Cited

U.S. PATENT DOCUMENTS

| | | | |
|---|---|---|---|
| 2,627,120 | 2/1953 | Hotchkiss | 29/898.09 |
| 3,447,239 | 6/1969 | Slick | 29/898.09 X |
| 3,672,019 | 6/1972 | Barnbrook et al. | 29/898.09 |
| 4,150,468 | 4/1979 | Harbottle | 29/898.09 |
| 4,336,641 | 6/1982 | Bhatia | 29/898.09 |
| 4,476,614 | 10/1984 | Pittroff | 29/898.09 |

*Primary Examiner*—Joseph M. Gorski
*Assistant Examiner*—S. Thomas Hughes
*Attorney, Agent, or Firm*—R. Thomas Payne

[57] ABSTRACT

A motor support bearing assembly is provided for a live axle used in locomotives. A wheel is press fit on each end of the axle under high pressure, with a gear secured between the wheels adjacent the pinion end of the axle. The motor support bearing assembly is located between the plain end wheel at the commutator end and the axle gear at the other end, and includes a housing, a tapered roller bearing adjacent the plain end wheel, and another tapered roller bearing adjacent the axle gear. In the motor support bearing assembly process, a master spacer made of hardened metal is placed in a selected space in the assembly. The plain end wheel is pressed onto the axle under high pressure. Axial end play in the motor support bearings is set by applying a spike of additional pressure to the plain end wheel, pressing the bearings together tightly and in some cases pre-loading the bearings. The master spacer is then removed and replaced by a slightly smaller shim, which releases pressure on the bearings and creates end play. The shim can be replaced by a still smaller shim if additional end play is desired. In this manner, and play is reduced significantly. In addition, the pressure with which the assembly is made makes a tighter assembly which lasts longer. Both the reduced end play and the tighter assembly improve performance over time.

6 Claims, 3 Drawing Sheets

1

METHOD FOR SETTING THE AXIAL END PLAY OF TAPERED ROLLER BEARINGS

This invention relates to a system and methods for setting the axial end play of tapered roller bearings, and more particularly, to a system and methods for setting the axial end play of motor support bearings used on locomotive axles.

BACKGROUND OF THE INVENTION

Modern train locomotives are powered by several electric motors which each turn a live axle and a pair of wheels secured to the axle by a press fit. The body of the locomotive is placed on journal bearings on the portion of the axles outside of the wheels, and the electric motor is secured between the wheels. The motor, the portion of the axle between the wheels, and a set of gears are housed in an assembly which includes two motor support bearings. One motor support bearing is adjacent the inside surface of the hub of the gear on the axle, and the other support bearing is adjacent the inside surface of the hub of the wheel on the side of the axle which is opposite the axle gear. The motor support bearings are tapered roller bearings which require closely controlled axial end play to obtain optimum life while at the same time avoiding overheating and possible seizure in use. However, the best performance and longest life are obtained with minimal to slightly preloaded end play.

In known locomotive assembly processes, the wheels and bearings are press fit on the axle with a gap between two selected pieces of the assembly. The gap is measured and one or more shims are assembled into a shim pack which fits snugly in the gap, setting the end play of the bearings. However, the end play cannot be accurately set at a low tolerance using this method, and the end play increases significantly in use, resulting in relatively poor long term performance. Thus, there is a need for improved methods for setting the axial end play of motor support bearings used in locomotives, to reduce end play in assembly and in use, and improve performance and product life.

Accordingly, one object of this invention is to provide new and improved methods for setting the axial end play of tapered roller bearings.

Another object is to provide new and improved methods and apparatus for setting the axial end play of press fit tapered roller bearings.

Still another object is to provide new and improved methods for setting the axial end play of motor support bearings used in locomotives.

SUMMARY OF THE INVENTION

In keeping with one aspect of this invention, a motor support bearing assembly is provided for a live axle such as that used in locomotives. The axle has a pinion end and a commutator end, and a wheel is press fit on each end of the axle under high pressure, with a gear secured between the wheels adjacent the pinion end of the axle. The motor support bearing assembly is located between the wheels, and includes a housing and a tapered roller bearing adjacent the axle gear and the opposite wheel.

In the motor support bearing assembly process, a master spacer made of hardened metal is placed in a selected space in the assembly. The wheels are pressed onto the axle under high pressure. Axial end play in the motor support bearings is set by applying a spike of additional pressure to the wheels during assembly, pressing the bearings together tightly and in some cases placing the bearings under stress. The master spacer is then removed and replaced by a slightly smaller shim, which releases pressure on the bearings and creates end play. The shim can be replaced by a still smaller shim if additional end play is desired. In this manner, end play is reduced significantly. In addition, the pressure with which the assembly is made makes a tighter assembly which lasts longer. Both the reduced end play and the tighter assembly improve performance over time.

BRIEF DESCRIPTION OF THE DRAWINGS

The above mentioned and other features of an embodiment of this invention and the manner of obtaining them will become more apparent, and will be best understood by reference to the following description, taken in conjunction with the accompanying drawings, in which.

DETAILED DESCRIPTION

Figure 1:
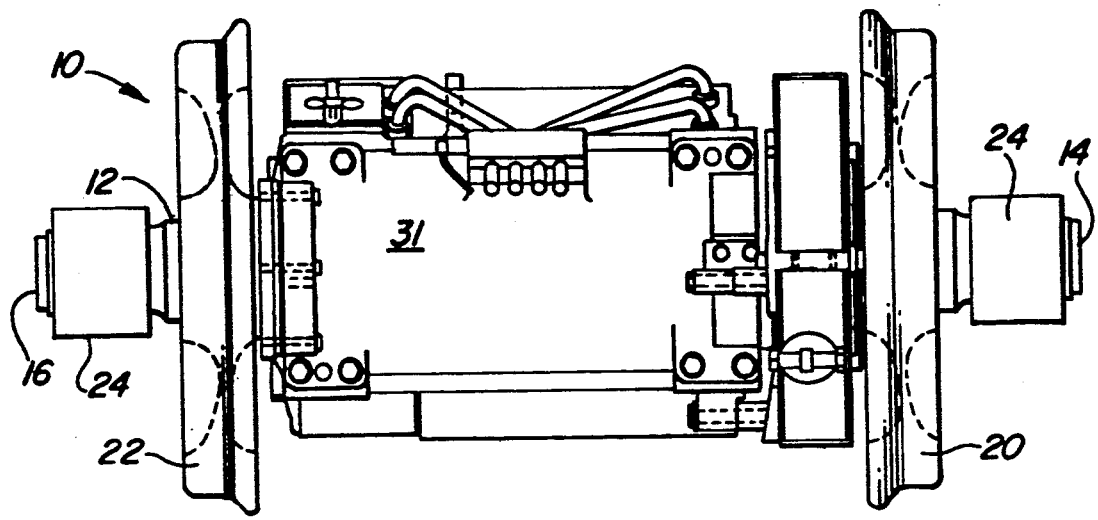
FIG. 1 is a side view of a motor gear assembly for locomotives.
Figure 2:
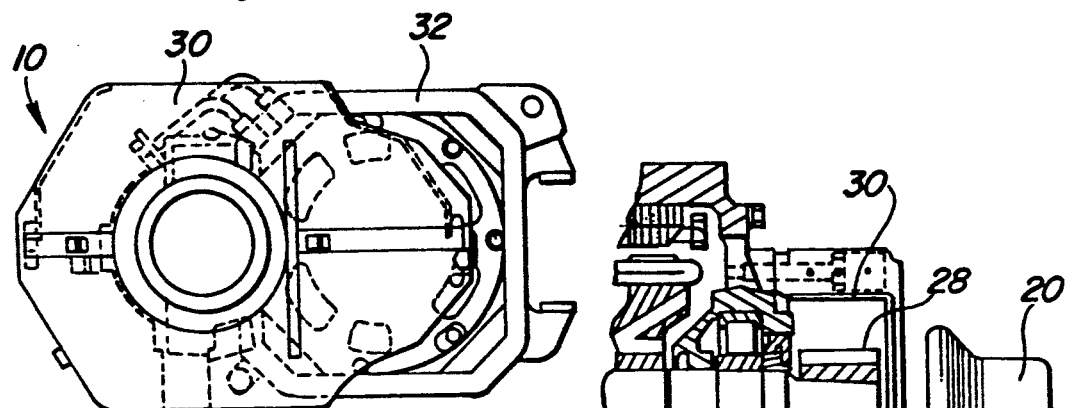
FIG. 2 is an end view of the assembly of FIG. 1.
Figure 3:
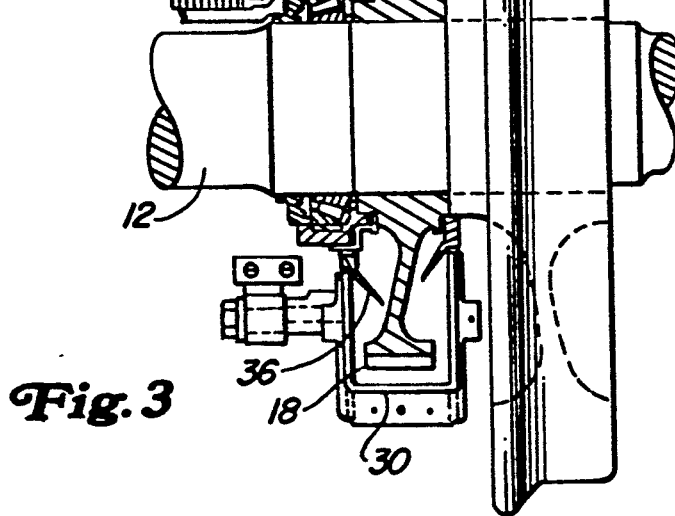
FIG. 3 is an enlarged view of a portion of the assembly of FIG. 1, taken in partial cross section.

As seen in FIGS. 1, 2 and 3, a motor axle assembly 10 for use in locomotives includes an axle 12 having a pinion end 14 and a commutator end 16, also called the plain end. An axle gear 18 is press fit on the axle 12 near the pinion end 14, and wheels 20, 22 are press fit on the axle 12 near the pinion end 14 and the commutator end 16, respectively. Journal bearings 24 are provided at the ends 14, 16 outside the wheels 20, 22, to support the weight of the locomotive.

The motor axle assembly 10 also includes a motor armature 26 having a drive pinion gear 28 which engages the axle gear 18, and a gear housing 30 which encloses the gears 18, 28. A U-tube 31 and a housing 32 enclose the axle 12 between the wheels 20, 22.

Figure 4:
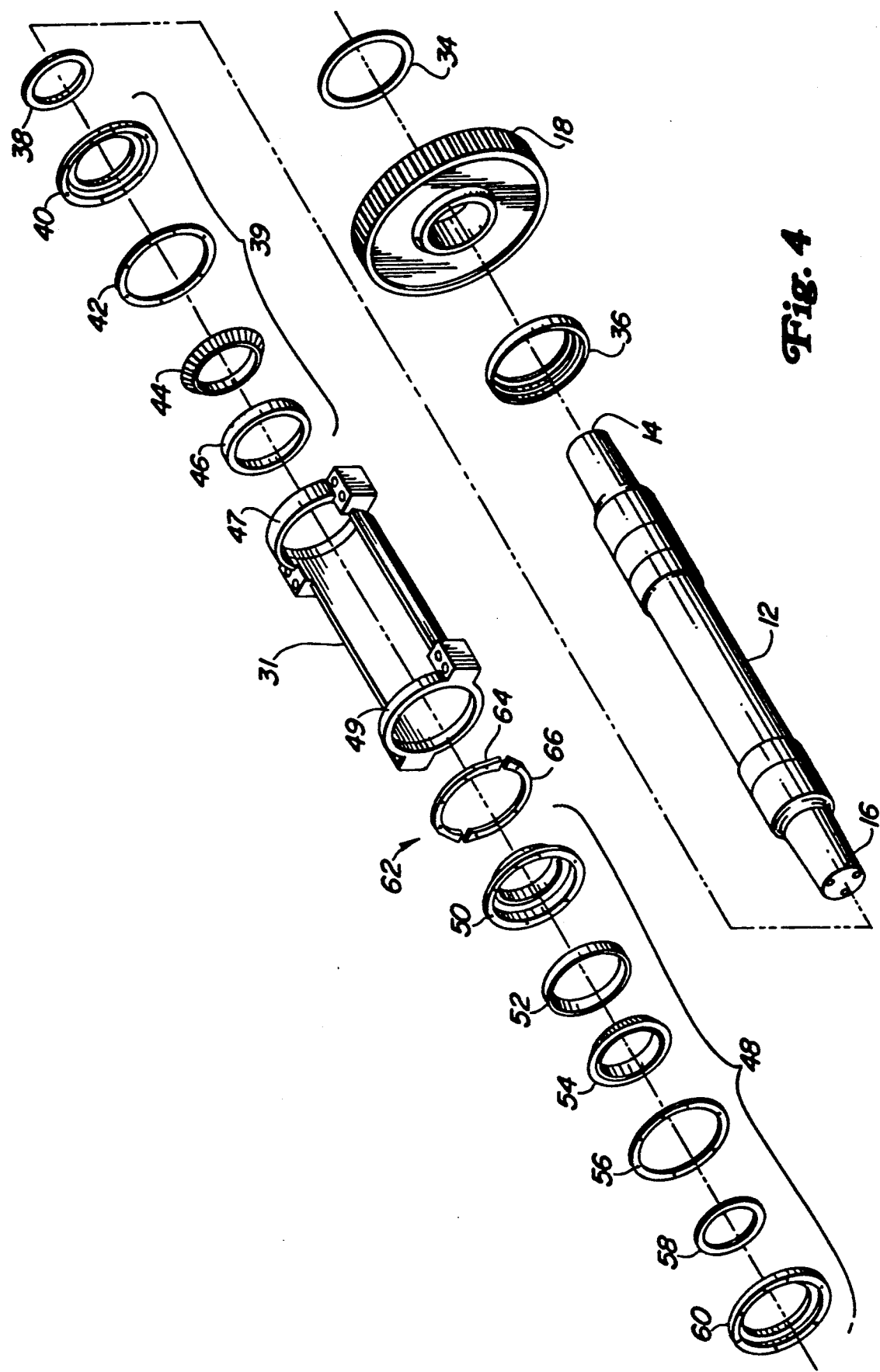
FIG. 4 is an exploded view of the axle and bearing assembly used in the motor gear assembly of FIG. 1.
Figure 5:
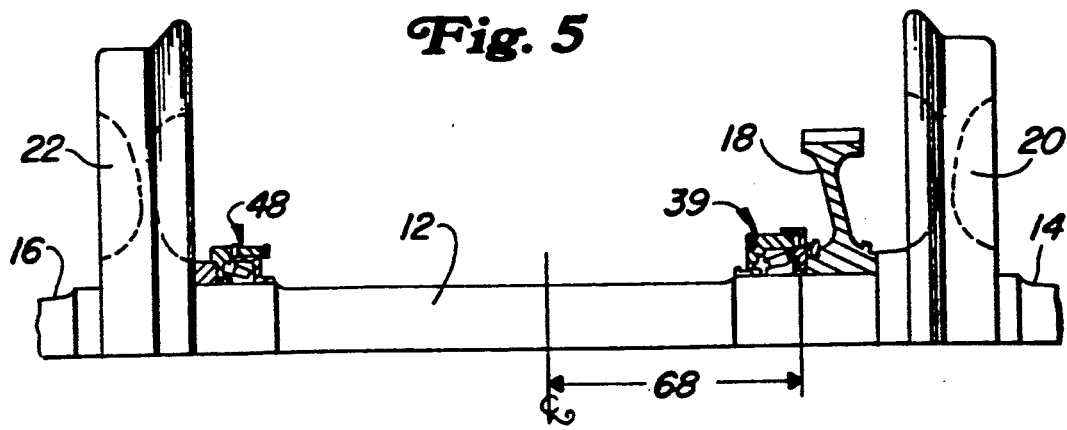
FIG. 5 is a side view of a portion of the assembly of FIG. 1, showing the placement of the motor support bearings on the axle.
Figure 6:
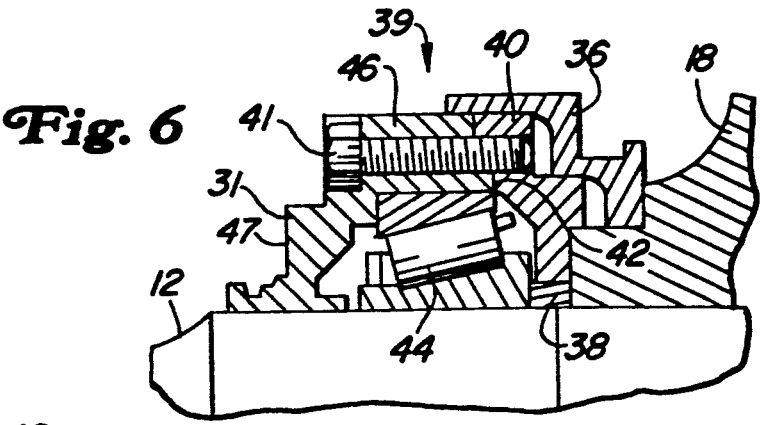
FIG. 6 is an enlarged cross sectional view of the pinion end bearing, shown to the right in FIG. 5.
Figure 7:
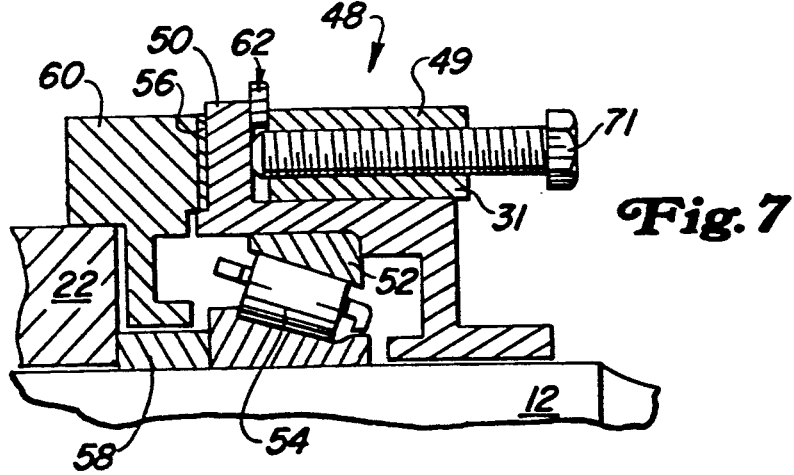
FIG. 7 is an enlarged cross sectional view of the commutator end bearing, shown to the left in FIG. 5.

The assembly 10 also includes a collar 34, a flinger 36, and a pinion end collar 38, as seen in FIG. 4. The flinger 36 covers the gear case and contains oil inside the gear housing 30.

A pinion bearing 39 includes a pinion end bearing cap 40, a pinion end gasket 42, a Timken-style roller bearing cone and roller assembly 44, and an outer bearing cup 46. The bearing 39 fits inside an end 47 of the U-tube 31.

A commutator bearing 48 fits in an end 49 of the U-tube 31. The bearing 48 includes a bearing housing 50, an outer bearing cup 52, an inner bearing cone and roller assembly 54, a commutator end gasket 56, a commutator end collar 58, and a commutator end bearing cap 60. A master spacer 62 is located between the U-tube 31 and the bearing housing 50, and the entire assembly 10 is assembled in the manner shown in FIGS. 4, 5, 6 and 7.

The master spacer 62 includes two halves 64, 66. The spacer 62 is made of hardened metal, and is preferably hardened to Rockwell C 42-48. The spacer 62 should be capable of re-use, with the ability to withstand pressures of up to at least 175 tons.

The assembly 10 is made by press fitting the gear 18 on the axle 12 a distance 68 from the center of the axle 12. The flinger 36 is heated to 100° C. higher than the gear 18 and installed next to the gear 18. The collars 34, 38 are also heated to 100° C. higher than the axle temperature, and positioned solidly against the hub of the gear 18.

The pinion end bearing cap 40 is then installed with appropriate bolts 41 (FIG. 6), and the pinion gasket 42 is installed over the bolts. The bolts 41 align the parts of the bearing assemblies until the end of the assembly procedure, when the bolts are tightened to seal the bearings.

The cone and roller assembly 44 is then heated to 100° C. above the axle temperature and seated into position as it cools, with the assembly 44 abutting the collar 38. The bearing 39 is then rotated to assure proper roller positioning. The pinion end cup 46 of the bearing 39 is then pressed into the end 47 of the U-tube 31.

The commutator end cup 52 of the bearing 48 is pressed into the bearing housing 50. The bearing housing 50 is aligned and pressed in the commutator end 49 of the U-tube 31, with the master spacer 62 between the end 49 and the bearing housing 50.

The assembled U-tube 31 is placed over the axle 12 and the bearing cap bolts 41 are installed. The U-tube 31 should be rotated to assure proper bearing roller positioning. Then the commutator cone assembly 54 is heated to 100° C. higher than the axle temperature and is installed on the axle 16. The U-tube 30 is again rotated to assure that the cone assembly 54 is fully advanced. A bearing weight can be used, if desired, to assure a solid seating of the cone assembly 54.

The collar 58 is then heated to 100° C. higher than the axle temperature and is installed on the axle 12. The gasket 56 is placed next to the bearing housing 50 with suitable sealant on both sides of the gasket, and the bearing cap 60 is installed by bolting.

The commutator wheel 22 is then pressed onto the axle 12 with about 110 to 155 tons of pressure. As the wheel 22 reaches the bearing collar 58 (FIG. 7), a pressure spike of an additional about 15 to 20 tons is applied to the wheel 22, to assure proper seating of the wheel 22 and the bearings 39, 48, and in some cases, to pre-load or stress the bearings 39, 48. The wheel 22, and the other heated parts, are secured in place when they cool.

Figure 8:
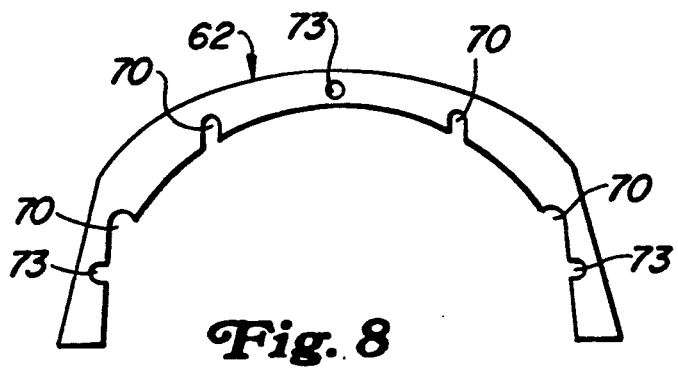
FIG. 8 is a side view of a half of a master spacer made in accordance with the invention.

The master spacer 62 is removed one half at a time with jack-out bolts 71. The spacer 62 includes several slots 70 (FIG. 8) which fit over but not around the jack-out bolts 71, to allow for removal of the spacer 62. The jack-out bolts 71 relieve the pressure between the U-tube 31 and the bearing housing 50. While the master spacer 62 is removed and replaced with an appropriate shim, as will be seen.

When the first half of the spacer 62 is removed, it is replaced with a slightly thinner shim. For example, a 0.095 inch master spacer could be used and replaced with a 0.090 inch shim by removing the spacer half 64 with jack-out bolts 71, and immediately replacing the half 64 with half of the shim. The other half 66 of the spacer 62 is then removed with the jack-out bolts 71 and immediately replaced with the other half of the shim. The bolts 41 which pass through openings 73 in the spacer 62 must be removed for this procedure and later replaced and tightened.

A magnetic base indicator can be used with a pry bar to measure the end play of the bearings. If there is insufficient end play, the 0.090 inch shim can be removed and replaced with a 0.085 inch shim. If there is still insufficient end play, the 0.085 inch shim can be replaced with a 0.080 inch shim.

Bearing life and performance are a function of end play, and are increased as end play is reduced, provided that there is sufficient end play to allow for heat expansion. Using the method discussed in connection with the background of this invention, an end play of about 0.010 to 0.015 inch during assembly was typical, and the end play would increase to about 0.045 inch in use. With this system and method, end play of about 0.002 to 0.007 inch is typical, and the end play increases to only about 0.004 to 0.009 inch in use. In addition, the life of the bearings is significantly increased.

While the principles of the invention have been described above in connection with specific apparatus and applications, it is to be understood that this description is made only by way of example and not as a limitation on the scope of the invention.

I claim:
1. A method for setting axial end play in a roller bearing assembly having relatively tight outer components secured between two surfaces, the axial end play in the bearing being determined by the relative tightness of the outer components of the bearing, comprising the steps of
placing a master spacer having a selected thickness between the bearing assembly and a selected one of the surfaces;
applying pressure to the two surfaces relative to each other thereby pressing the two surfaces firmly against the assembly and placing the assembly in a stressed condition;
securing the two surfaces against the bearing in the stressed condition;
removing the master spacer; and
replacing the master spacer with a shim having a thickness which is less than the thickness of the master spacer;
thereby reducing the stress between the two surfaces and the bearing enough that the bearing has a desired end play.
2. The method of claim 1 wherein the bearing is secured to an axle for a locomotive.
3. The method of claim 2 wherein one of the two surfaces is a locomotive wheel.
4. The method of claim 3 wherein the other of the two surfaces is a housing which at least partially surrounds the axle, a gear and another locomotive wheel are located on the opposite end of the housing.
5. The method of claim 3 wherein the pressure applying step further comprises:
applying about 110 to about 155 tons pressure to the locomotive wheel thereby pressing the wheel onto the axle, and applying additional pressure of about 15 to about 20 tons to the locomotive wheel to create the stressed condition.
6. The method of claim 4 wherein, in the pressure applying step, pressure is applied to one of the locomotive wheels and the gear.

* * * * *